United States Patent [19]

Farr

[11] Patent Number: 4,633,981
[45] Date of Patent: Jan. 6, 1987

[54] ROTARY FLYWHEEL SKID SENSING MEANS FOR VEHICLE HYDRAULIC BRAKING SYSTEMS

[75] Inventor: Glyn P. R. Farr, Warwickshire, England

[73] Assignee: Lucas Industries Public Limited Company, Great Britain

[21] Appl. No.: 704,771

[22] Filed: Feb. 22, 1985

[30] Foreign Application Priority Data

Mar. 7, 1984 [GB] United Kingdom ............ 8405905
Jul. 23, 1984 [GB] United Kingdom ............ 8418698

[51] Int. Cl.⁴ .............................................. B60T 8/40
[52] U.S. Cl. .................................. 188/181 A; 303/116
[58] Field of Search ........... 188/181 R, 181 A, 181 T, 188/181 C, 184, 185; 192/147; 303/115, 116, 119

[56] References Cited

U.S. PATENT DOCUMENTS

| 35,064 | 4/1862 | Perry | 188/185 |
|---|---|---|---|
| 3,415,343 | 12/1968 | Svensson | 188/184 X |
| 4,340,258 | 7/1982 | Farr | 303/115 |
| 4,377,221 | 3/1983 | Farr | 303/116 X |

FOREIGN PATENT DOCUMENTS 1241798 8/1971 United Kingdom ........... 188/181 A

Primary Examiner—Duane A. Reger
Assistant Examiner—Richard R. Diefendorf
Attorney, Agent, or Firm—Laff, Whitesel, Conte & Saret

[57] ABSTRACT

A rotary flywheel mechanism comprising a flywheel driven from a wheel driven shaft through a thrust member and angularly spaced balls located in complementary recesses in adjacent faces of the flywheel and the thrust member is disclosed. A locking mechanism is incorporated to prevent operation of the flywheel mechanism until the vehicle has attained a predetermined minimum road speed. The locking mechanism comprises a centrifugally-operable weight carried by the flywheel and which is normally urged inwardly by a spring and into engagement with the thrust member to lock the flywheel and the thrust member against relative movement. The centrifugal force generated at speeds above the minimum speed urges the weight outwardly to unlock the flywheel and the thrust member. The weight may comprise a plunger guided for radial movement in a radial bore in the flywheel, or the weight may comprise a mass carried by a lever which is angularly movable about a pivot parallel to the axis of the shaft.

8 Claims, 4 Drawing Figures

ROTARY FLYWHEEL SKID SENSING MEANS FOR VEHICLE HYDRAULIC BRAKING SYSTEMS

This invention relates to rotary flywheel skid sensing means for a vehicle hydraulic braking system of the kind comprising a flywheel mechanism rotatable with a shaft adapted to be driven from a wheel to be braked and including a flywheel member and a thrust member together with camming means responsive to relative angular movement between the two said members to cause one of the said members to move axially relative to the other between a first angular position in which the two members are in a predetermined angular alignment and a second angular position in which the said one axially movable member co-operates with means to actuate brake pressure modulating means.

In skid sensing means of the kind set forth problems may arise when a vehicle is travelling at low speeds, for example in traffic and, in response to a panic brake application, the brakes can be relieved prematurely, albeit in response to a genuine skid signal. Of course this will depend upon the sensitivity of the skid sensing means but it is desirable to prevent the skid sensing means from operating until the vehicle is travelling at a predetermined minimum speed, thereby obviating the danger of the vehicle "rolling-onto" a vehicle in front should that vehicle stop quickly.

We are aware of GB No. 1 241 798 which discloses skid sensing means, particularly for heavy vehicles, in which inhibit means are incorporated for preventing operation of the skid sensing means at low vehicle speeds. The skid sensing means of GB No. 1 241 798 comprises a first speed-responsive governor rotatable synchronously with a wheel-driven rotatable member and adapted to effect brake release by displacing a control element axially with respect to the rotatable member when the speed of rotation of the rotatable member is at or below a critical speed at which the first speed-responsive governor mechanism will collapse. The inhibit means comprises a second speed-responsive governor mechanism which has a critical speed greater than that of the first governor mechanism and, in a collapsed position at low vehicle speeds, co-operates with the control element to prevent it from moving axially with respect to the rotatable member, thereby preventing the first governor mechanism from collapsing to release the brake. Each governor mechanism comprises a set of weights arranged circumferentially around the rotatable member, and each weight is secured to the outer end of an arm which, in turn, is pivotally mounted for angular movement about an axis lying in a plane normal to the axis of the rotatable member so that the arms and their respective weights move through arcs lying in planes containing the axis of the rotatable member.

According to our invention in a skid sensing means of the kind set forth centrifugally-operable locking means are provided for locking the two members together in the said first angular position against relative movement, and the locking means are automatically releasable in response to a centrifugal force of a magnitude which corresponds to a predetermined minimum road speed for the vehicle, the locking means comprising at least one weight which is movable in a plane normal to the axis of the shaft, the weight being normally urged inwardly by resilient biassing means into a locking position to lock the two members together, and the weight being movable in an outward direction and into a disengaged position when the centrifugal force to which it is subjected attains a value greater than that corresponding to the said minimum road speed, whereafter the two members are free to move relative to each other.

The weight may comprise a plunger which is guided in a radial bore in one of the members and is resiliently biassed into engagement at its inner end in a complementary notch in the other member. Alternatively the weight may be pivotally mounted on a pivot on one of the members for movement about an axis parallel to the axis of the shaft, with a spring provided normally on a pivot for urging a portion of the weight into engagement with a complementary notch in the other member.

The notch may be of substantial circumferential length and may comprise a continuous groove. The engagement of the weight in the groove prevents relative axial movement between the two members. Alternatively the notch may comprise an axial slot, the engagement of the weight in which prevents relative angular movement between the two members.

When the locking means comprises a plunger, two such plungers are provided and are preferably diametrically arranged with respect to each other.

In one construction the flywheel member is journalled for rotation on the shaft and is fixed axially, and the thrust member is movable axially and of annular outline, being received, at least partially, in an annular recess in one end of the flywheel. In such a construction the locking means are carried by the flywheel member and the notch is provided in the adjacent outer face of the thrust member.

Two embodiments of our invention are illustrated in the accompanying drawings in which.

Figure 1:
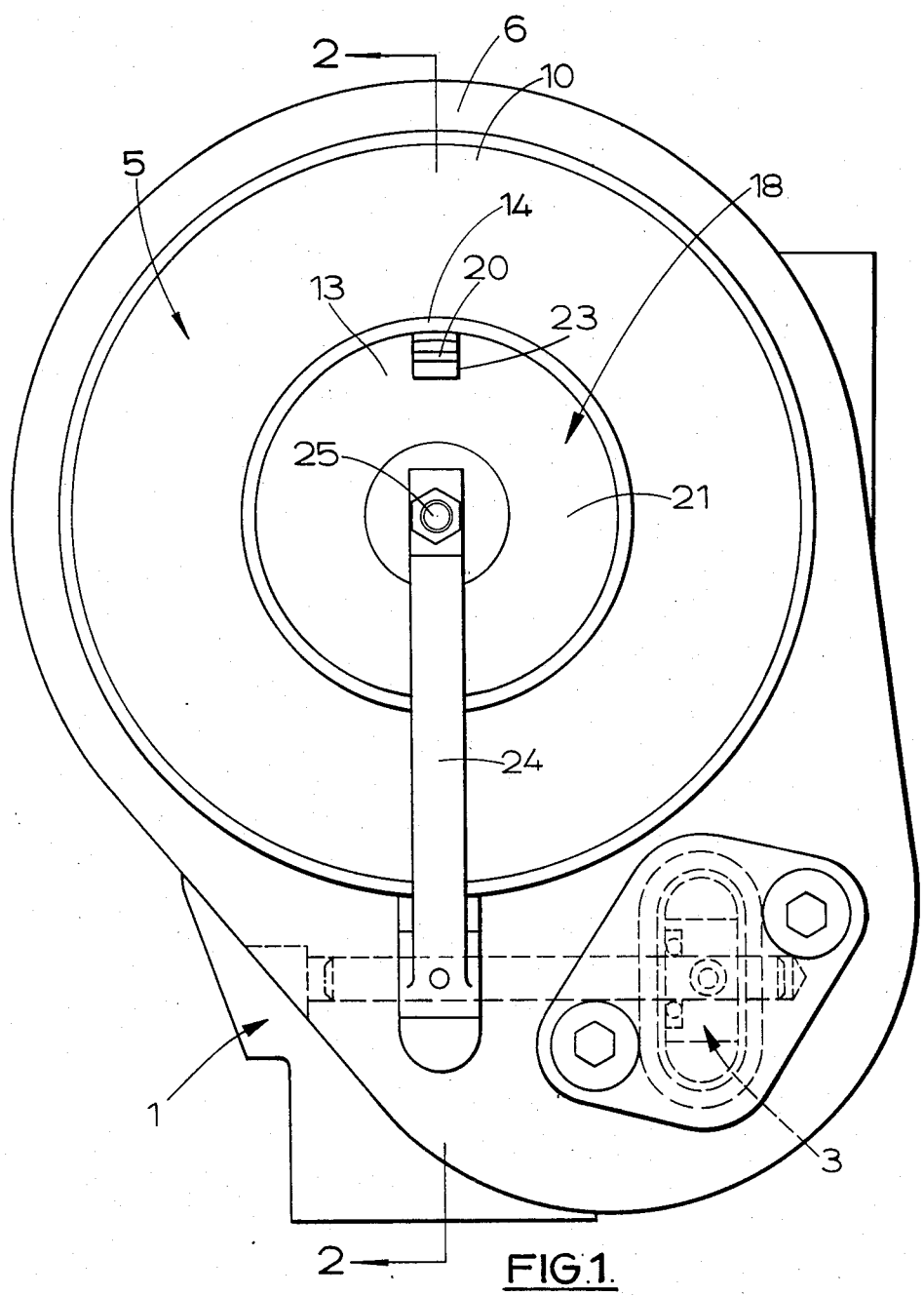
FIG. 1 is an end view of rotary flywheel skid sensing means with the cover removed for clarity.
Figure 2:
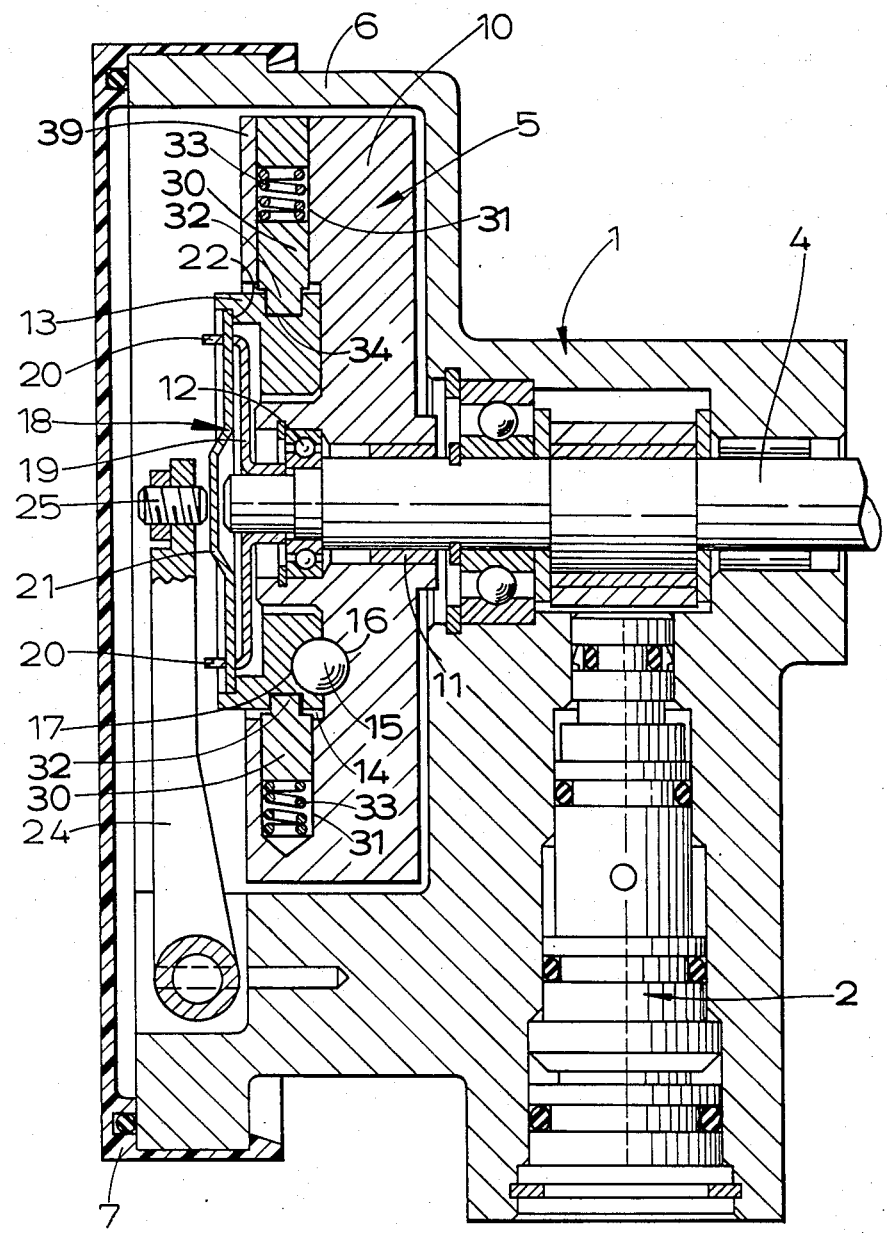
FIG. 2 is a section on the line 2—2 of FIG. 1.

The sensing means illustrated in FIGS. 1 and 2 of the drawings comprises a housing 1 incorporating an hydraulic pump 2 and a combined pressure dump valve and modulator assembly 3. A longitudinally extending shaft 4 projecting at opposite ends from the housing 1 is coupled at one end to the wheel to be braked and at the other end carries skid sensing means 5 in the form of a flywheel assembly which is enclosed within a cylindrical radial rim portion 6 of the housing 1 of which the open, outer, end is closed by a detachable cover 7. The rim portion 6 protects the mechanism from radially directed flying debris and other objects.

The flywheel assembly 5 comprises a flywheel 10 which is rotatable on spaced bearings 11 and 12 adjacent to one end of the shaft 4, and an annular thrust member 13 which is at least partially accommodated within an annular recess 14 in the end of the flywheel 10 which faces the outer end of the rim portion 6. A clearance is provided between the outer edge of the thrust member 13 and the outer wall of the recess 14, and between the inner edge of the thrust member 13 and the inner wall of the recess 14.

Three angularly spaced balls 15 are located in complementary recesses 16, 17 in adjacent faces of the flywheel 10 and the thrust member 13.

The thrust member 13 is carried from the free end of the shaft 4 by mounting means 18. The mounting means comprises a radial driving flange 19 which is fast with the free end of the shaft 4, and is provided at its peripheral edge with a pair of diametrically arranged parallel-sided lugs 20 which project axially towards the outer end of the rim portion 6, and a clutch plate 21 of dished outline which engages frictionally at its outer peripheral edge with a radial clutch face 22 on the thrust member 13 and in which is provided a pair of diametrically spaced notches 23 which slidably receive the lugs 20. The dished form in the clutch plate 21 provides a clearance with respect to the free end of the shaft 4.

The thrust member 13 is urged towards the flywheel 10 by a force from a bias spring (not shown) and this force is transmitted to the thrust member 13 through the clutch plate 21 and an angular lever 24 mounted in the housing 1. The lever 24 acts on the clutch plate 21 in a position in axial alignment with the rotational axis of the shaft 4 through an adjustable thrust-transmitting member 25 which is screwed through the lever 24 so that the biassing force is applied centrally to the mounting means 18. Since the thrust member 13 can articulate and move radially with respect to the flywheel 10, the load from the bias spring is shared substantially equally between the three balls 15.

A pair of diametrically opposed bob-weights 30 in the form of plungers are located in radial bores 31 in the outer wall or rim 39 of the flywheel 10 which defines the outer wall of the annular recess 14. The radial bores 31 lie on a plane normal to the axis of the shaft 4. Each plunger 30 has an inner end portion 32 of reduced diameter which is normally urged by a compression spring 33 in the respective bore 31 into engagement with a circumferentially extending groove 34 in the adjacent outer face of the thrust member 13.

Normally, therefore, the plungers 30 are urged inwardly by the springs 33 to engage in the groove 34. This locks the flywheel 10 and the thrust member 13 against relative axial movement and, because of the presence of the balls 15 housed in the recesses 16 and 17, also against relative angular movement.

The weight of the plungers 30 is chosen such that at vehicle road speeds above-predetermined minimum speed, the centrifugal force so generated is sufficient to urge the plungers 30 in a radially outwards direction, withdrawing them from the groove 34 in order to unlock the flywheel 10 and the thrust member 13. In fact the weight of the plungers 30 is chosen such that the plungers 30 will not release the skid sensing means below a vehicle minimum road speed of for example, 10 m.p.h.

After the plungers 30 have been released, in further operation relative angular movement between the flywheel 10 and the thrust member 13, due to excessive deceleration of the wheel and the shaft, with the flywheel 10 running on due to its inertia, causes the balls 15 to tend to ride out of the recesses 16 and 17 thereby urging the thrust member 13 and the clutch plate 21 axially away from the flywheel 10. This moves the lever 24 angularly, in turn to operate the combined modulator and dump valve assembly. The clutch plate 21 slides on the lugs 20. Thereafter the flywheel 10 and the thrust member 13 run on against the frictional force of engagement between the clutch plate 21 and the clutch face 22 of which the threshold is determined by the loading in the bias spring. This threshold can be readily adjusted or otherwise set by adjusting the axial position of the member 25 relative to the lever 24, after removal of the cover 7.

In modification the circumferential groove 34 is replaced by an axial slot.

In another modification the bores 31 and the compression springs 33 are omitted and each of the pair of diameterically opposed bob-weights 30 is carried by one end of a strip of resilient material, suitably an elongate blade spring or leaf spring, which extends in a generally circumferential direction and of which the other end co-operates with the flywheel, suitably by means of a rigid connection or other anchorage. The blade or leaf springs act to bias the bob-weights 30 substantially in the same directions as they are biassed by the compression springs 33. The construction and operation of this modified sensing means is otherwise the same as that of FIGS. 1 and 2.

Figure 3:
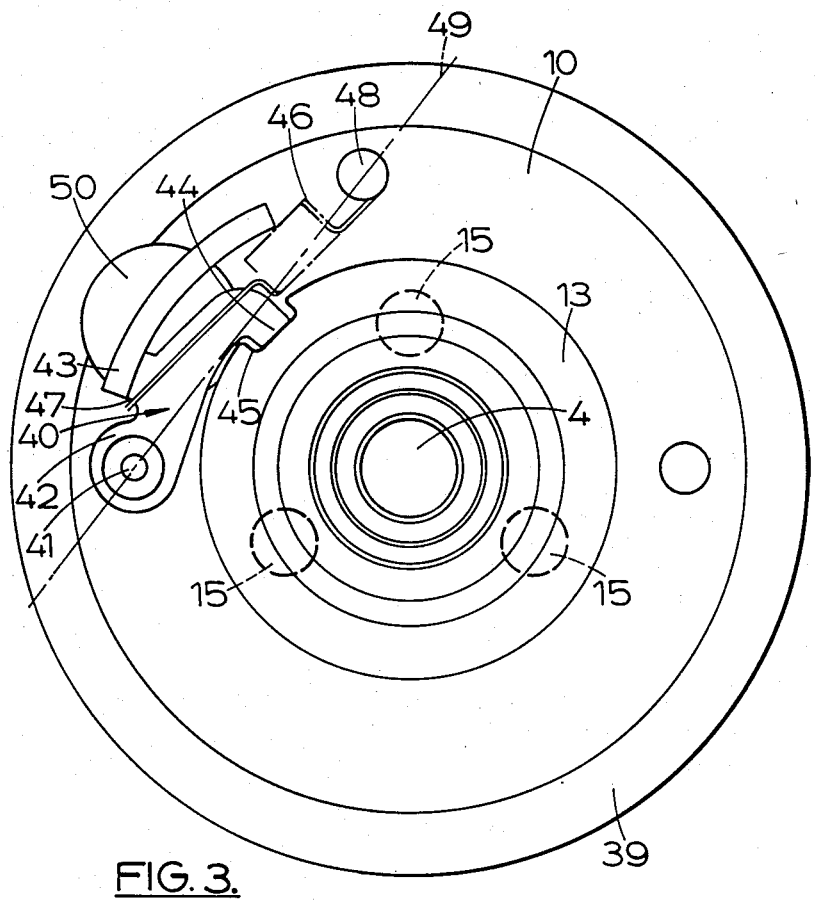
FIG. 3 is an end view similar to FIG. 1 but with the housing omitted and showing a different locking means.
Figure 4:
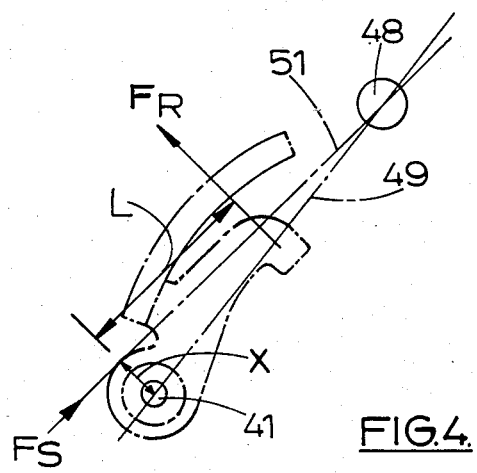
FIG. 4 is a force diagram.

In the construction illustrated in FIGS. 3 and 4 of the drawings, a weight 40 is pivotally mounted at one end for angular movement through an arc in a plane normal to the axis of the shaft. The weight 40 is movable about a pivot 41 in the end face of the flywheel 10 adjacent to the recess 14 and the pivot 41 is parallel to the axis of the shaft 4. The weight 40 comprises lever 42 extending circumferentially from the pivot 41, and a mass 43 carried by the radially outermost end of the lever 42 and disposed relatively close to the rim 39 of the flywheel 10. The mass 43 is of arcuate outline and projects circumferentially beyond the outer end of the lever 42 which is remote from the pivot 41. An inwardly directed projection 44 at the outer end of the lever 42 is engageable in an axially extending slot 45 in the outer face of the thrust member 13.

A tension spring 46 is attached at opposite ends between a slight recess 47 between the lever 42 and the end of the mass 43 adjacent to the pivot 41, and an anchorage 48 in the end face of the flywheel 10 and spaced from the outer ends of the lever 42 and the mass 43. The recess 47 is displaced radially outwards from a chord 49 passing through the pivot 41 and the anchorage 48 so that the spring 46 applies a resultant force to the lever 42 in a direction normally to urge the projection into registry in the slot 45.

A lightening hole 50 is provided in the end wall of the flywheel 10 to compensate for the weight of the weight 40.

By providing the majority of the weight in the mass 43 and arranging it close to the rim 39 of the flywheel 10 increases the centrifugal effect obtained for a given speed in comparison with that obtained in the embodiment of FIGS. 1 and 2. This is of advantage in providing a more sudden action to enable the projection 44 to snap into and out of engagement in the slot 45.

This is achieved by holding the distance "χ" between the line of action passing through the chord 49, and the line of action 51 passing through the spring 46 to a relatively small dimension.

It follows, as shown in FIG. 4, that taking moments about 41 gives $$Fr \times L = Fs \times \chi,$$

where Fs is the force in the spring 46; and Fr is the centrifugal force acting at the lever radius "L".

Thus the centrifugal force Fr can rapidly overcome the action of the spring force Fs beyond the amount by which the spring 46 extends, due to movement of the lever 42, which is relatively small.

The construction and operation of the skid sensing means of FIGS. 3 and 4 are otherwise the same as FIGS. 1 and 2, and corresponding reference numerals have been applied to corresponding parts.

The skid sensing means described above are suitable for use with motor cycles or other light motor vehicles, such as light passenger cars.

I claim:

1. Rotary flywheel skid sensing means for a vehicle hydraulic braking system comprising a shaft adapted to be driven from a wheel to be braked for rotation about an axis, and a flywheel mechanism rotatable with said shaft, said flywheel mechanism comprising a flywheel member, a thrust member, and camming means responsive to relative angular movement between the said two members to cause one of the said members to move axially relative to the other of said two members between a first angular position in which the said members are in a predetermined angular alignment and a second angular position in which the said one axially movable member co-operates with means to actuate brake pressure modulating means, wherein centrifugally-operable locking means are provided for locking the said members together in the said first angular position against relative movement, and said locking means are automatically releasable in response to a centrifugal force of a magnitude which corresponds to a predetermined minimum road speed for the vehicle, said locking means comprising at least one weight which is movable in a plane normal to said axis of said shaft, and resilient means for urging said weight inwardly into a locking position to lock the said members together, and said weight being movable in an outward direction and into a disengaged position when said centrifugal force to which said weight is subjected attains a value greater than that corresponding to the said minimum road speed, whereafter said two members are free to move relative to each other, wherein one of said members has a radial bore, and the other of said members has a notch, said weight comprising a plunger which is guided in said radial bore and has an inner end, and said resilient means is adapted to bias said weight into engagement at said inner end in said notch in the said other member.

2. A skid sensing means as claimed in claim 1, wherein two weights are provided, and one of said members is provided with a pair of diametrically opposed bores, each weight comprising a plunger guided in a respective one of said opposed bores, each plunger having an inner end, and the other of said members having a notch means, and wherein said resilient means is adapted to bias said plungers into engagement at said inner ends in said notch means.

3. A skid sensing means as claimed in claim 1, wherein said notch is of substantial circumferential length, and the engagement of said weight in said notch prevents relative axial movement between said two members.

4. Rotary flywheel skid sensing means for a vehicle hydraulic braking system comprising a shaft adapted to be driven from a wheel to be braked for rotation about an axis, and a flywheel mechanism rotatable with said shaft, said flywheel mechanism comprising a flywheel member, a thrust member, and camming means responsive to relative angular movement between the said two members to cause one of the said members to move axially relative to the other of said two members between a first angular position in which the said members are in a predetermined angular alignment and a second angular position in which the said one axially movable member co-operates with means to actuate brake pressure modulating means, wherein centrifugally-operable locking means are provided for locking the said members together in the said first angular position against relative movement, and said locking means are automatically releasable in response to a centrifugal force of a magnitude which corresponds to a predetermined minimum road speed for the vehicle, said locking means comprising at least one weight which is movable in a plane normal to said axis of said shaft, and resilient means for urging said weight inwardly into a locking position to lock the said members together, and said weight being movable in an outward direction and into a disengaged position when said centrifugal force to which said weight is subjected attains a value greater than that corresponding to the said minimum road speed, whereafter said two members are free to move relative to each other, wherein said weight is pivotally mounted on a pivot on one of the members for movement about an axis parallel to said axis of said shaft, and said other of said members is provided with notch means, said weight having a locking portion, and wherein a spring urges said locking portion of the weight into engagement with said notch means, said weight having a center of gravity acting through a point disposed between said pivot and said locking portion.

5. A skid sensing means as claimed in claim 4, wherein the weight comprises a lever extending circumferentially from said pivot and having a radially outermost end, and a mass carried by said radially outermost end of said lever, and an inwardly directed projection on the said weight is engageable with said notch means.

6. A skid sensing means as claimed in claim 4, wherein said notch means comprises an axial slot, and the engagement of said weight in said axial slot prevents relative angular movement between said two members.

7. Rotary flywheel skid sensing means for a vehicle hydraulic braking system comprising a shaft adapted to be driven from a wheel to be braked for rotation about an axis, and a flywheel mechanism rotatable with said shaft, said flywheel mechanism comprising a flywheel member, a thrust member, and camming means responsive to relative angular movement between the said two members to cause one of the said members to move axially relative to the other of said two members between a first angular position in which the said members are in a predetermined angular alignment and a second angular position in which the said one axially movable member co-operates with means to actuate brake pressure modulating means, wherein centrifugally-operable locking means are provided for locking the said members together in the said first angular position against relative movement, and said locking means are automatically releasable in response to a centrifugal force of a magnitude which corresponds to a predetermined minimum road speed for the vehicle, said locking means comprising at least one weight which is movable in a plane normal to said axis of said shaft, and resilient means for urging said weight inwardly into a locking position to lock the said members together, and said weight being movable in an outward direction and into a disengaged position when said centrifugal force to which said weight is subjected attains a value greater than that corresponding to the said minimum road speed, whereafter said two members are free to move relative to each other, wherein said weight is pivotally mounted on a pivot on one of the members for movement about an axis parallel to said axis of said shaft, and other of said members is provided with notch means, said weight having a locking portion, wherein a spring urges said locking portion of the weight into engagement with said notch means, and wherein said spring comprises a tension spring which acts between a first anchorage on the said one member and a second anchorage on said weight, said anchorage on said weight being displaced outwardly from a chord passing through said pivot and said first anchorage.

8. Rotary flywheel skid sensing means for a vehicle hydraulic braking system comprising a shaft adapted to be driven from a wheel to be braked for rotation about an axis, and a flywheel mechanism rotatable with said shaft, said flywheel mechanism comprising a flywheel member, a thrust member, and camming means responsive to relative angular movement between the said two members to cause one of the said members to move axially relative to the other of said two members between a first angular position in which the said members are in a predetermined angular alignment and a second angular position in which the said one axially movable member co-operates with means to actuate brake pressure modulating means, wherein centrifugally-operable locking means are provided for locking the said members together in the said first angular position against relative movement, and said locking means are automatically releasable in response to a centrifugal force of a magnitude which corresponds to a predetermined minimum road speed for the vehicle, said locking means comprising at least one weight which is movable in a plane normal to said axis of said shaft, and resilient means for urging said weight inwardly into a locking position to lock the said members together, and said weight being movable in an outward direction and into a disengaged position when said centrifugal force to which said weight is subjected attains a value greater than that corresponding to the said minimum road speed, whereafter said two members are free to move relative to each other, wherein said flywheel member is journalled for rotation on said shaft, is fixed axially with respect to said shaft, and is provided in one end with an annular recess, and said thrust member is movable axially and is of annular outline, being received, at least partially, in said annular recess in said flywheel member, said locking means being carried in said flywheel member, and a notch being provided in the adjacent face of said thrust member for engagement by said locking means.

* * * * *